(12) United States Patent
Loentgen et al.

(10) Patent No.: US 12,195,144 B2
(45) Date of Patent: Jan. 14, 2025

(54) PRESSURE-RESISTANT BUOYS

(71) Applicant: Acergy France SAS, Suresnes (FR)

(72) Inventors: Vincent Loentgen, Chambry (FR); Olivier Lodeho, Paris (FR); Yann Brouard, Velizy (FR)

(73) Assignee: ACERGY FRANCE SAS, Suresnes (FR)

( * ) Notice: Subject to any disclaimer, the term of this patent is extended or adjusted under 35 U.S.C. 154(b) by 363 days.

(21) Appl. No.: 17/442,856

(22) PCT Filed: Mar. 19, 2020

(86) PCT No.: PCT/IB2020/000331
§ 371 (c)(1),
(2) Date: Sep. 24, 2021

(87) PCT Pub. No.: WO2020/194064
PCT Pub. Date: Oct. 1, 2020

(65) Prior Publication Data
US 2022/0185429 A1  Jun. 16, 2022

(30) Foreign Application Priority Data
Mar. 25, 2019 (GB) .................................... 1904109

(51) Int. Cl.
*B63B 3/13* (2006.01)
*B22F 10/25* (2021.01)
(Continued)

(52) U.S. Cl.
CPC ................ *B63B 3/13* (2013.01); *B33Y 10/00* (2014.12); *B33Y 80/00* (2014.12); *B63B 22/00* (2013.01);
(Continued)

(58) Field of Classification Search
CPC ............ B63B 3/13; B63B 22/00; B33Y 10/00; B33Y 80/00; B22F 10/25; B22F 10/28;
(Continued)

(56) References Cited

U.S. PATENT DOCUMENTS 3,622,437 A * 11/1971 Hobaica .................. B29C 70/66
                                                      473/118
4,021,589 A *  5/1977 Copley ...................... B32B 3/26
                                                      428/323

(Continued)

FOREIGN PATENT DOCUMENTS

FR   2 375 024      7/1978
GB   2 393 426      3/2004
(Continued)

OTHER PUBLICATIONS

Online article, "3D Printing in Metals," www.3d-alchemy.co.uk/3d-printing-metals.html (2016).

*Primary Examiner* — Daniel V Venne
(74) *Attorney, Agent, or Firm* — MATTINGLY & MALUR, PC

(57) ABSTRACT

A subsea buoy comprises a rigid watertight external shell extending continuously around a supporting internal structure that is sealed and fully enclosed by the shell. The shell is formed integrally and simultaneously with the internal structure by the same additive manufacturing process. The internal structure comprises cavities disposed between structural members, such as struts of a lattice or webs of a matrix. The structural members and cavities can be in a hierarchical or fractal array comprising a relatively narrow outer tier adjoining the shell and at least one relatively wide inner tier within the outer tier.

27 Claims, 6 Drawing Sheets

(51) Int. Cl.
  *B22F 10/28* (2021.01)
  *B22F 10/80* (2021.01)
  *B33Y 10/00* (2015.01)
  *B33Y 80/00* (2015.01)
  *B63B 22/00* (2006.01)
  *F16L 1/24* (2006.01)

(52) U.S. Cl.
  CPC ............... *F16L 1/24* (2013.01); *B22F 10/25* (2021.01); *B22F 10/28* (2021.01); *B22F 10/80* (2021.01); *B22F 2301/052* (2013.01)

(58) Field of Classification Search
  CPC ....... B22F 10/80; B22F 2301/052; F16L 1/24; Y02P 10/25; E21B 17/012
  USPC .......................................................... 441/1
  See application file for complete search history.

(56) References Cited

U.S. PATENT DOCUMENTS 4,052,862 A    10/1977  Lamy
  4,678,586 A *   7/1987  Kearney .................. C09D 7/71
                                                        210/764
  9,032,892 B2 *  5/2015  Colquhoun ............. B63B 21/50
                                                          441/4
  9,216,524 B1   12/2015  Cook et al.
  10,040,515 B2 *  8/2018  Mellor ................... B63G 8/001
  10,167,061 B2   1/2019  Bregonzio et al.
  10,775,534 B2   9/2020  Hundley et al.
  11,421,486 B2 *  8/2022  Daasvatn ............... E21B 17/017
  2002/0142683 A1  10/2002  Campbell et al.
  2006/0159523 A1   7/2006  Dixon et al.
  2013/0251957 A1   9/2013  Watkins et al.

FOREIGN PATENT DOCUMENTS

GB        2564117         1/2019
  WO     WO 99/44881        9/1999
  WO     WO 00/75546       12/2000
  WO     WO 02/063127       8/2002
  WO    WO 2015/095617      6/2015
  WO    WO 2016/086268      6/2016
  WO    WO 2016/128884      8/2016

* cited by examiner

PRESSURE-RESISTANT BUOYS

BACKGROUND OF THE INVENTION

This invention relates to buoys that can be used to apply buoyant upthrust to submerged structures such as subsea pipelines. The invention relates particularly to buoys that are designed to resist the hydrostatic pressure of immersion in deep water over a long period.

Unless the context requires otherwise, references to 'buoys' in this specification encompass other buoyancy devices such as buoyancy modules or buoyancy elements that can be assembled together to make such buoys or modules.

A simple buoy comprises a hollow shell of metal or composite material enclosing a buoyant gas-filled volume. An example is a buoyancy tank as described in WO 02/063127. Buoys of this type are severely limited in terms of operational water depth because the wall of the shell has to withstand crushing under external hydrostatic pressure. This makes such buoys impractical for use at the depths in which, for example, subsea oil and gas is commonly extracted and produced.

Increasing hydrostatic pressure with depth requires the wall of a hollow shell to be thicker and therefore heavier, hence reducing the net upthrust capacity of the buoy and increasing its cost. Alternatively, the shell has to be filled with gas at elevated pressure to compensate for the external hydrostatic pressure that is expected in use. Such a solution is complex and is not practical for handling massive hydrostatic pressure in deep water, especially if the internal pressure has to be adjusted as the buoy is being lowered from the surface to its operational depth.

Conventionally, a buoy for use in deep water is constructed largely of polymer materials. Typically such a buoy comprises a light foam such as a closed-cell polyurethane foam, which is chosen for its low density and impermeability. The foam is commonly encased in an impermeable jacket layer that protects the foam against abrasion and water ingress.

A foam variant known as syntactic foam embeds rigid hollow buoyant spheres in a resin matrix. The spheres may, for example, be of fibreglass as taught in FR 2375024 or microspheres of metal as described in WO 99/44881. Alternatively, hollow tubes may be bundled together within a buoy as disclosed in US 2013/0251957 and in WO 00/75546.

Polymer buoys suffer from ageing in that their buoyancy tends to decrease with time of immersion. For example, polymer buoys immersed in water for long periods may suffer from water absorption. In deep water, there is the additional problem of shrinkage, and hence a reduction in displacement, due to creep under hydrostatic pressure and changes in temperature.

WO 2016/128884 describes buoyancy devices that employ buoyant macrospheres with light metal shells. The macrospheres are held together within a surrounding housing to transfer the upthrust of their collective buoyancy to the housing.

WO 2016/086268 describes a buoy that comprises a composite structure of polymer-based buoyancy elements disposed within a hollow compartmentalised shell. The shell has polymer walls formed by an additive manufacturing process, such as fused deposition modelling or 3D printing. The buoyancy elements are placed into respective compartments of the shell. The shell is then closed with a cover that is attached to the shell to enclose the buoyancy elements within their respective compartments.

Optionally, the cover is sealed to the shell in WO 2016/086268 but as the cover and the shell are separate components, an interface remains between them. This interface creates a line of weakness and presents a potential leakage path. In any event, there is no suggestion that the polymer shell could withstand hydrostatic pressure to resist collapse and water ingress at great depth. Instead, reliance is placed on the polymer-based buoyancy elements to displace water within the compartments and therefore to generate the required buoyancy. Consequently, the problem of ageing of the buoyancy elements remains.

Similar problems apply to the buoyancy unit disclosed in GB 2393426, which has a multi-part outer shell having several interfaces representing potential leak paths.

SUMMARY OF THE INVENTION

There remains a need for buoys that can withstand hydrostatic pressure of 200-300 bars or more without collapse and that will not lose buoyancy over time, even at great depth.

Against this background, the invention provides a subsea buoy that comprises a rigid watertight external shell extending continuously around an internal space that is sealed and fully enclosed by the shell. The shell is supported by a foraminous internal structure within the internal space, formed integrally with the shell by an additive manufacturing process.

The internal structure is of aluminium and suitably comprises structural members extending within the internal space, for example arranged in a lattice, and cavities disposed between the members.

The cavities may be discrete spaces that are isolated from each other. For example, the cavities may be generally ellipsoidal or spheroidal voids, each surrounded by webs of a continuous matrix that defines the structural members.

The cavities may instead, or additionally, be conjoined spaces that communicate with each other. For example, the internal structure may be skeletal, in which case the structural members may be struts that cooperate to form trusses. Thus, the cavities may be generally polyhedral, for example substantially tetrahedral or octahedral.

Advantageously, the structural members are in an array comprising an outer tier of such members extending inwardly from the shell into the internal space and at least one inner tier of such members disposed within the outer tier. The outer tier may be narrower or thinner than the inner tier, and suitably extends parallel to a wall of the shell from which the structural members of the outer tier extend into the internal space.

The structural members of the outer tier are closer together than the structural members of the or each inner tier. The structural members of the or each inner tier may be thicker than the structural members of the outer tier. The cavities of the or each inner tier may be larger than the cavities of the outer tier.

The structural members of the outer tier may be in fractal relation to the structural members of the or each inner tier. Each structural member of an inner tier may divide into two or more structural members of the outer tier.

The structural members and/or the cavities may be irregular in at least a portion of the buoy, for example if the geometry and/or physical characteristics of the internal structure and/or the shell have been determined using a topology optimisation algorithm. The shell may also vary in thickness.

Preferably, the cavities of the internal structure have an aggregate volume of at least 63% of the external volume of the shell. More preferably, the cavities of the internal structure may have an aggregate volume of up to 83% of the external volume of the shell. If steel is used, the cavities of the internal structure may have an aggregate volume of up to 95% of the external volume of the shell.

The external shell of the buoy is preferably formed of aluminium. In that case, an external anti-corrosion jacket may extend continuously around the shell, or at least one sacrificial anode may be mounted on the shell. Alternatively, the internal structure and the external shell of the buoy may be formed of differing materials. For example, in an embodiment the internal structure is formed of aluminium and the external shell is formed of steel.

The inventive concept embraces a corresponding method of making a subsea buoy. That method comprises: using an additive manufacturing process to form a foraminous internal structure of aluminium; and simultaneously, using the same additive manufacturing process to form a rigid continuous watertight external shell around and integral with the internal structure, which shell, when completed, seals and fully encloses the internal structure. The method further comprises progressively adding material to form structural members of the internal structure that are integral with the shell and to define cavities of the internal structure between those structural members, so that the structural members are in an array comprising an outer tier of such members extending inwardly from the shell into the internal space and at least one inner tier of such members disposed within the outer tier. The structural members of the outer tier are closer together than the structural members of the inner tier. The external shell may be formed from a metal such as aluminium or steel. The external shell and the internal structure may be formed from differing materials.

The additive manufacturing process may be selected from a group comprising: direct metal laser sintering; electron beam melting; selective heat sintering; selective laser melting; selective laser sintering; indirect metal printing; directed energy deposition; and fuse deposition modelling.

The geometry of the internal structure and/or the shell may be determined using an optimisation algorithm.

Thus, the invention provides a subsea buoy that comprises a rigid watertight external shell extending continuously around an internal space that is sealed and fully enclosed by the shell. The shell is supported by an internal structure within the internal space. The internal structure comprises structural members that are formed integrally with the shell by an additive manufacturing process to define cavities within the internal space, disposed between the structural members.

In summary, the invention relates to the manufacture of a buoy using an additive manufacturing process that can preferably employ steel as a base material, such as carbon steel, manganese steel or other steel alloys, as well as aluminium or aluminium alloy. A typical steel has a density of 7850 kg/m$^3$, while aluminium typically has a density of 2700 kg/m$^3$.

The invention addresses the challenge of determining an internal or bulk volume structure to sustain sufficient external hydrostatic pressure and to achieve a volume ratio of aluminium to voids of below 37%, and preferably in the range of between 17% and 22%. For steel, the volume ratio is below 12.5%, and preferably in the range of between 5% and 10%.

Another approach of the invention is to use an additive process to manufacture a macrosphere, honeycomb or foam arrangement using aluminium or other materials.

Embodiments of the invention provide a method to manufacture a buoy, the method comprising performing additive manufacturing of the buoy by adding up successive layers of a base material such as aluminium, steel or a steel alloy, wherein the layers are added in a skeleton structure. The buoy suitably comprises a leak-tight outer shell manufactured by the same method.

Each layer may have a lattice structure. More generally, the skeleton structure may have a lattice, honeycomb or fractal arrangement.

The ratio of base material to voids is preferably below 37% in terms of volume, more preferably between 17% and 22%. If steel is used, the volumetric ratio is preferably below 12.5%, and more preferably between 5% and 10%.

Embodiments of the invention also provide a metallic buoy that comprises an outer shell and a honeycomb internal structure, the outer shell and the internal structure being manufactured by an additive process. The additive process may employ the same metal or two or more different metals, such as steel or a steel alloy, or aluminium.

The buoy may comprise one or more corrosion protection measures, such as sacrificial anodes on the outer shell or a polymer jacket covering the outer shell.

Various additive manufacturing techniques may be employed to make a buoy of the invention, for example as disclosed in WO 2015/095617. More generally, buoys of the invention may be made by powder bed fusion processes such as direct metal laser sintering (DMLS), electron beam melting (EBM), selective heat sintering (SHS), selective laser melting (SLM) or selective laser sintering (SLS). Indirect metal printing, directed energy deposition (DED) or fuse deposition modelling (FDM) are also possible.

Thus, a subsea buoy of the invention comprises a rigid watertight external shell extending continuously around a supporting internal structure that is sealed and fully enclosed by the shell. The entire shell is formed integrally and simultaneously with the internal structure by the same additive manufacturing process.

The internal structure comprises cavities disposed between structural members, such as struts of a lattice or webs of a matrix. The structural members and cavities may be in a fractal array comprising a relatively narrow or thin outer tier adjoining the shell and at least one relatively wide or thick inner tier within the outer tier.

BRIEF DESCRIPTION OF THE DRAWINGS

In order that the invention may be more readily understood, reference will now be made, by way of example, to the accompanying drawings in which.

DETAILED DESCRIPTION OF THE INVENTION

Figure 1:
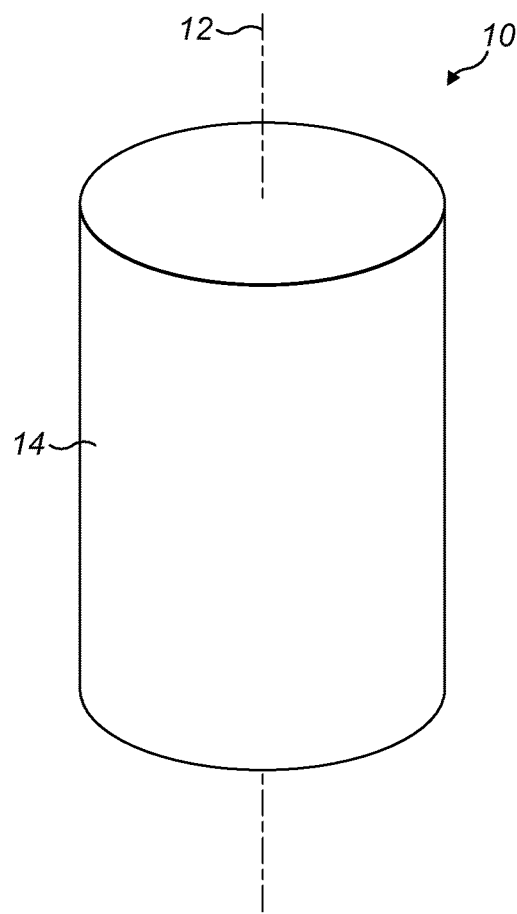
FIG. 1 is a schematic perspective view of a cylindrical buoy of the invention.
Figure 2:
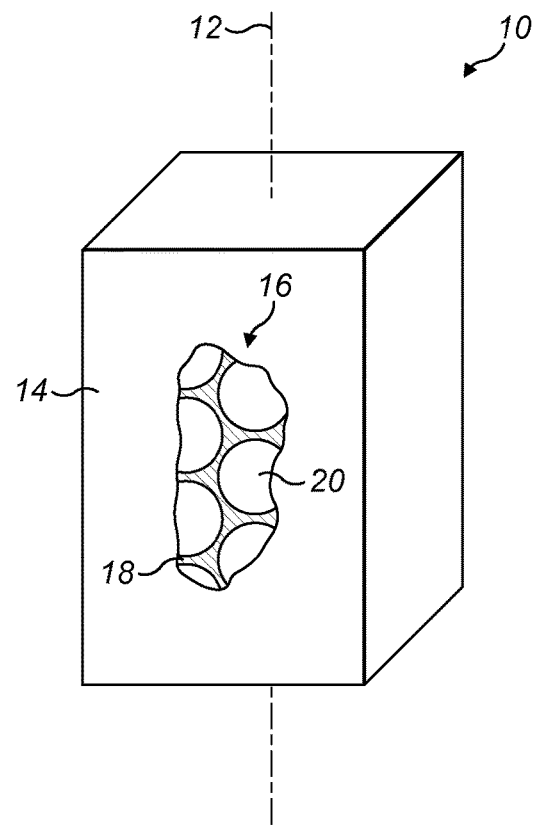
FIG. 2 is a schematic perspective view of a cuboidal buoy of the invention, partially cut away to reveal its internal structure.

Referring firstly to FIGS. 1 and 2, these schematic drawings show that buoys 10 of the invention may have various outer shapes. The buoys 10 shown here have conventional shapes, exemplified by a cylindrical buoy 10 in FIG. 1, which is rotationally symmetrical about a central longitudinal axis 12, and a cuboidal buoy 10 in FIG. 2. The invention also facilitates the manufacture of buoys with other shapes, such as the part-annular buoyancy elements shown in FIG. 5.

Fixings or formations for attaching the buoys 10 to other subsea elements or structures, such as chains or pipelines, have been omitted from these simplified drawings.

Each buoy 10 comprises an external shell 14 that is a pressure-resistant continuous hollow outer shell of a rigid material, preferably of metal and more preferably of aluminium. The shell 14 is formed integrally with, and supported by, a foraminous internal structure 16 that is shown schematically in FIG. 2.

The shell 14 and the internal structure 16 are formed together by an additive manufacturing process, such that the shell 14 surrounds the internal structure 16 completely and continuously within an internal space 17 that is hollow, sealed and fully enclosed by the external shell 14. The shell 14 thereby resists hydrostatic pressure and water ingress while being supported against collapse by the internal structure 16.

The internal structure 16 comprises a rigid structural frame 18, also preferably of metal such as steel or aluminium, and more preferably of aluminium, that is formed integrally with the shell 14 during the additive manufacturing process. The frame 18 defines multiple internal voids or cavities 20.

Thus, in a preferred embodiment the shell 14 and the frame 18 are both formed of aluminium. In other embodiments different materials may be used for the shell 11 and the frame 18 to achieve a desired balance between structural strength and density. For example, the frame 18 may be of aluminium and the shell 14 of steel.

The cavities 20 may be discrete spaces that are separated or isolated from each other as shown here, or may instead be conjoined, interconnected or intercommunicating with each other. Thus, the frame 18 may surround each cavity 20 continuously, in the manner of a matrix in which the cavities 20 are embedded like individual bubbles, pores or spheres in a rigid or syntactic foam. Alternatively, the cavities 20 may surround or contain structural members 21 that define the frame 18, in the manner of a skeleton or a spaceframe comprising multiple trusses 33.

The cavities 20 contain a gas, such as air, nitrogen or a noble gas, which may be at atmospheric or elevated pressure. Where the cavities 20 contain a gas at elevated pressure, that pressure may suitably be selected to counterbalance, at least partially but not necessarily fully, the hydrostatic pressure expected at the operational depth.

The cavities 20 together define an aggregate gas-filled volume that offsets the weight in seawater of the shell 14 and the frame 18. Thus, the volume of water displaced by the shell 14 must weigh substantially more than the weight in water of the shell 14 and the frame 18, plus the weight of gas trapped within the cavities 20. That excess displacement defines the net positive buoyancy or upthrust that will be provided by the buoy 10 when it is submerged fully in seawater in use.

Throughout the appendant drawings, the frame 18 and the cavities 20 are not shown to scale. In practice, the cavities 20 may be smaller, more numerous and closer together than is shown. Thus, the webs or members 21 of the frame 18 occupying the interstices between, or extending through, the cavities 20 will be thinner and hence lighter than is shown. It will of course be appreciated that the frame 18 should be as light as possible and that as much as possible of the internal space within the shell 14 should be devoted to the cavities 20, This ensures that the buoys 10 can be as compact and inexpensive as possible for a given level of upthrust, consistent with maintaining the necessary degree of resistance to hydrostatic pressure.

Figure 3:
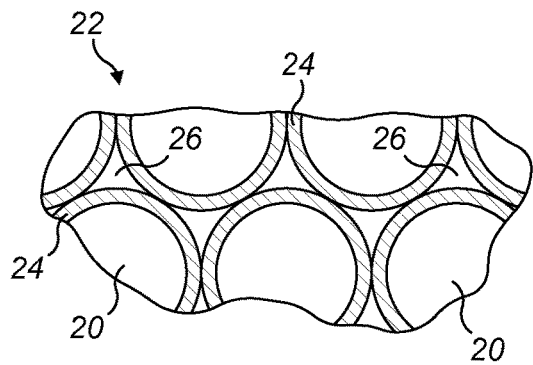
FIG. 3 is a schematic sectional detail view of a mass of buoyant spheres within a buoy, as known in the prior art.
Figure 4:
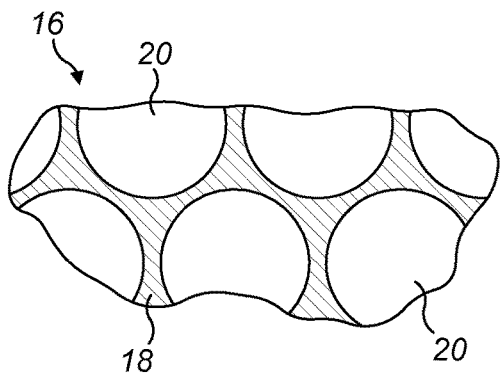
FIG. 4 corresponds to FIG. 3 but shows an equivalent honeycomb of spherical buoyant cavities formed within a matrix made by additive manufacturing in accordance to the invention.

Turning next to FIGS. 3 and 4, these drawings illustrate advantages of the invention, as exemplified in FIG. 4, over an equivalent prior art arrangement as shown in FIG. 3. Like numerals are used for like features.

FIG. 3 shows a detail of a buoy 22 in which cavities 20 are defined by a closely-packed mass of spheres 24 as known in prior art such as the aforementioned WO 2016/128884. The spheres 24 may be classified as microspheres or macrospheres, depending upon their diameter. They are held together in a surrounding housing, which is not shown, to transfer the upthrust of their collective buoyancy to that housing.

It will be noted that interstitial spaces 26 are left around and between the spheres 24, no matter how closely-packed the spheres 24 may be. The interstitial spaces 26 are typically flooded with seawater in use and so do not contribute to the net upthrust of the buoy 22. Each individual sphere 26 is therefore subjected to hydrostatic pressure while the surrounding housing is not. The spheres 24 therefore need thick and heavy walls to resist collapse. Similarly, there are double wall thicknesses between adjacent cavities 20 defined by neighbouring spheres 24. This increases the amount of negatively-buoyant material within the housing and therefore further reduces the net upthrust of the buoy 22 for a given size and hence external displacement.

If the spheres 24 are instead contained within a sealed rigid housing or shell 14 like that shown in FIGS. 1 and 2, the interstitial spaces 26 could be instead filled with a gas such as air so as to contribute to the net upthrust of the buoy 22. However, in that case, the intercommunicating interstitial spaces 26 would all flood if the shell 14 is ever breached and therefore there would be a risk of a catastrophic and sudden loss of buoyancy in the event of even minor damage to the buoy 22. Also, a mass of spheres 24 presents an uneven or undulating outer surface that provides ineffective support to a surrounding shell 14.

By contrast, the internal structure 16 of the invention shown in FIG. 4 illustrates that, by virtue of additive manufacturing, ellipsoidal or spherical cavities 20 of a similar size to those shown in FIG. 3 may be defined with less negatively-buoyant material in the continuous matrix between them that serves as the frame 18. In particular, there is no need for a double wall thickness between adjacent cavities 20 because a single wall thickness is instead shared between those cavities 20. Nor are there any floodable interstitial spaces between the cavities 20 and consequently there is no need or risk of flooding. Also, as will be explained, the cavities 20 can be sized, positioned and distributed in the matrix to provide optimal support for the surrounding shell 14 that is shown in FIGS. 1 and 2.

Figure 5:
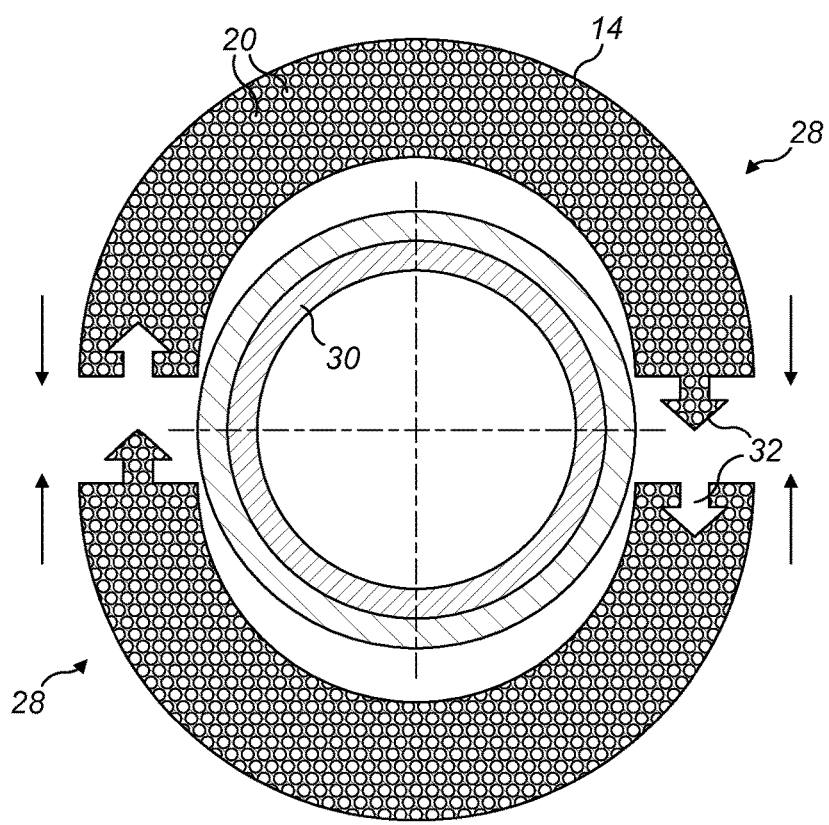
FIG. 5 is a schematic cross-sectional view of part-annular buoyancy elements of the invention being assembled around a subsea pipeline.

FIG. 5 shows a further advantage of making buoys of the invention in a single additive manufacturing process, which is to produce a seamless structure in one operation with any desired outer shape. In this respect, FIG. 5 shows part-annular buoyancy elements 28 of the invention being assembled together around a subsea pipeline 30 to form an annular buoyancy module.

The buoyancy elements 28 shown in FIG. 5 have interlocking formations 32 that engage with their opposed counterparts to hold the buoyancy elements 28 together around the pipeline 30. Conveniently, the interlocking formations 32 may be defined by shaping the shell 14 during additive manufacturing rather than being attached to, or removed from, the shell 14 in a subsequent operation. This avoids lines of weakness by removing interfaces between the interlocking formations 32 and the remainder of the shell 14. The interlocking formations 32 may also contain cavities 20 that contribute to net upthrust.

The remaining drawings, FIGS. 6 to 12, show various arrangements for the frame 18 and cavities 20 of foraminous internal structures of the invention, formed integrally with the shell 14 during additive manufacture of a buoy 10. The buoys 10 shown in these drawings may have various external shapes, including cylindrical and cuboidal shapes like the buoys 10 shown in FIGS. 1 and 2. FIGS. 6 to 12 illustrate characteristics of the internal structure that may be applied to buoys 10 of any external shape. In this respect, is to be understood that foraminous does not necessarily mean porous and that the cavities 20 may either communicate with each other or be closed, or there may be a combination of such cavities 20.

Figure 6:
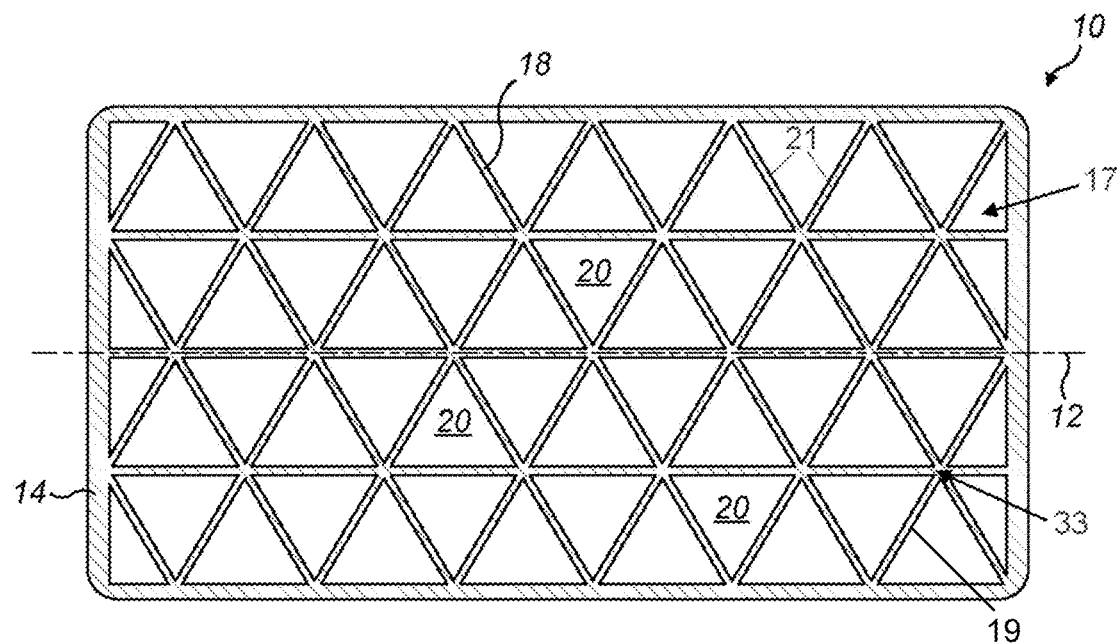
FIG. 6 is a schematic sectional view of a buoy of the invention whose internal structure comprises a substantially regular triangulated lattice formed by additive manufacturing.

In FIG. 6, the shell 14 of a buoy 10 is integral with an internal structure whose frame 18 is in the form of a lattice. In this example, the lattice frame 18 comprises members 21 that are arranged in a regular triangulated array. The members of the frame 18 shown here may represent rods or struts 19 that define the trusses 33 extending across the interior of the shell 14 between conjoined cavities 20. Alternatively, the members of the frame 18 may be continuous walls or webs that surround and enclose separate cavities 20, for example spaces or cells of a tetrahedral, octahedral or other polyhedral shape, which could be discrete and sealed from each other.

Figure 7:
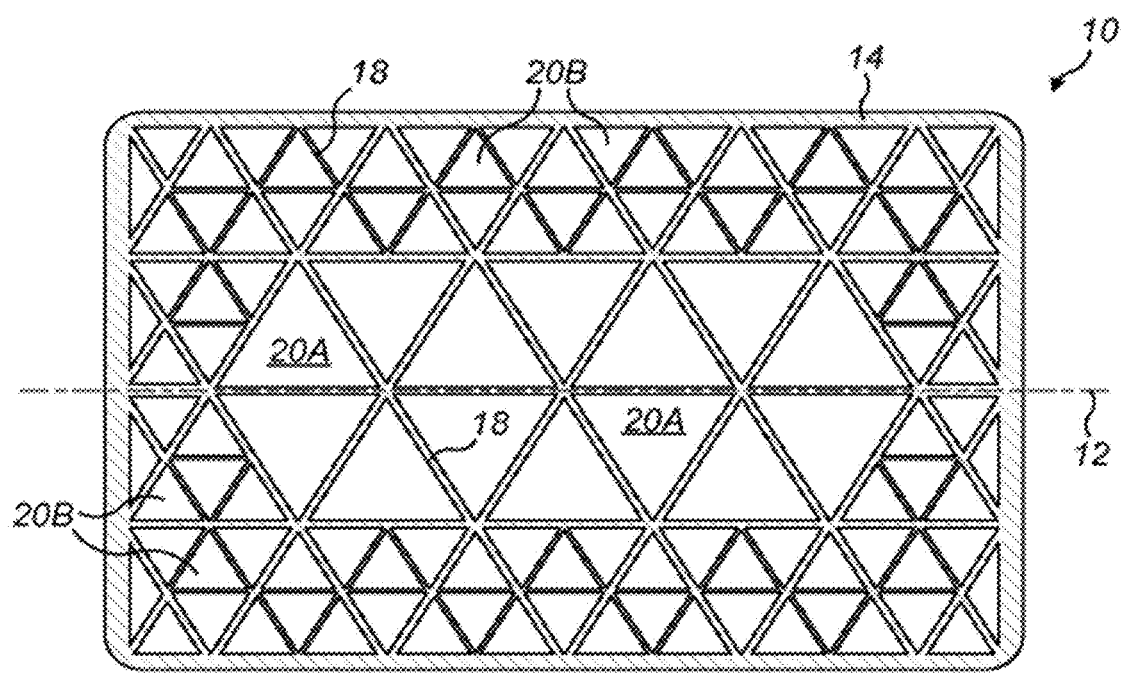
FIG. 7 is a schematic sectional view of a buoy of the invention whose internal structure comprises a fractal triangulated lattice formed by additive manufacturing.

The buoy 10 shown in FIG. 7 illustrates a variant of the arrangement shown in FIG. 6, in which the regular array of the members of the frame 18 is replaced by a fractal array. The cavities 20 in the simplified fractal structure of the frame 18 shown here are arranged in two tiers in rows extending parallel to the adjacent outer surface of the shell 14, namely an inner tier of cavities 20A and an outer tier of cavities 20B disposed between the inner tier and the shell 14. Thus, the members of the frame 18 between the cavities 20B of the outer tier support the shell 14 directly and also lie outside the cavities 20A of the inner tier.

The cavities 20B of the outer tier are smaller than the cavities 20A of the inner tier. Consequently, the members of the frame 18 between the cavities 20B are correspondingly closer together than the members of the frame 18 between the cavities 20A. This distributes or concentrates more of the material of the frame 18 closer to the shell 14 and therefore optimises support for the shell 14 against hydrostatic pressure acting inwardly against the shell 14.

As the members of the frame 18 in the inner tier are spaced further apart than those in the outer tier, a greater weight per unit volume of the frame 18 in the outer tier is offset to some extent by a lesser weight per unit volume of the frame 18 in the inner tier.

It will be apparent that, in this example, there is a self-similar or substantially fractal relationship between the cavities 20B of the outer tier and the cavities 20A of the inner tier. The cavities 20B of the outer tier are arranged in smaller triangular arrays that, apart from their size, otherwise correspond to the triangular array of the cavities 20A of the inner tier. The side of each cavity 20B is about half of the length of the corresponding side of each cavity 20A.

Figure 8:
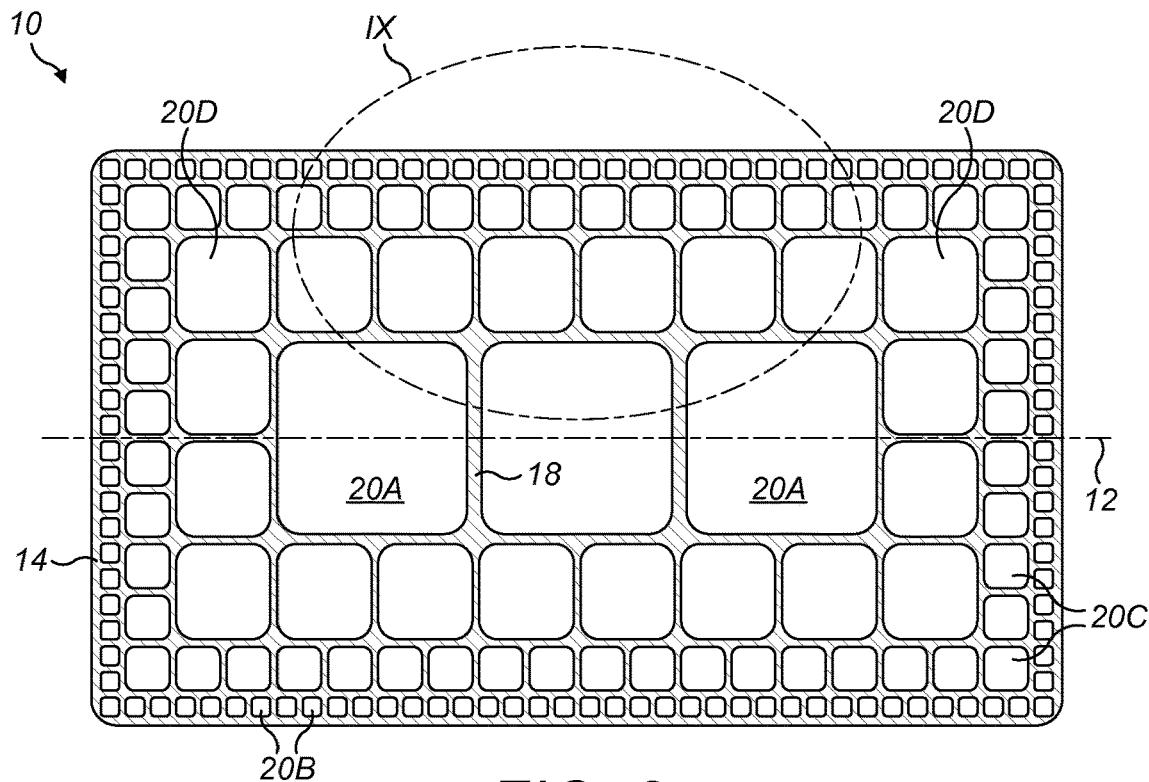
FIG. 8 is a schematic sectional view of a buoy of the invention whose internal structure comprises a fractal rectangular lattice formed by additive manufacturing.
Figure 9:
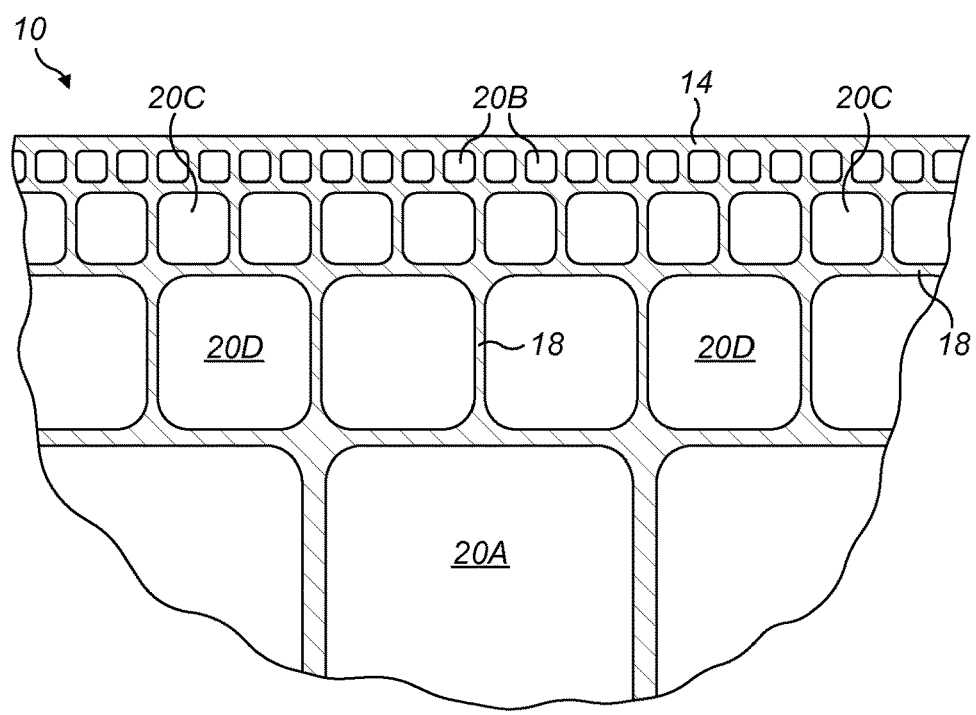
FIG. 9 is an enlarged view corresponding to Detail IX in FIG. 8.

FIG. 8 and the enlarged detail view of FIG. 9 also illustrate a buoy 10 in which the internal structure defined by the members of the frame 18 comprises a fractal array. Again, the effect is to concentrate the material of the frame 18 closer to the shell 14, maximising the number of members of the frame 18 that connect to the shell 14 while minimising their mutual spacing. This maximises support for the shell 14 against inward hydrostatic pressure without a commensurate increase in the overall weight of the frame 18.

In the example shown in FIGS. 8 and 9, the cavities 20 are generally cuboidal. Also, there are intermediate tiers of cavities 20C, 20D interposed between the larger cavities 20A of the innermost tier and the smaller cavities 20B of the outermost tier. As before, the tiers extend in rows parallel to the adjacent outer surface of the shell 14.

Again, there is a self-similar or substantially fractal relationship between the cavities 20A, 20B, 20C, 20D of the tiers in outward succession. In this case, the side of each cavity 20B, 20C, 20D is about half of the length of the corresponding side of each cavity 20A, 20B, 20C of the tier immediately within.

Figure 10:
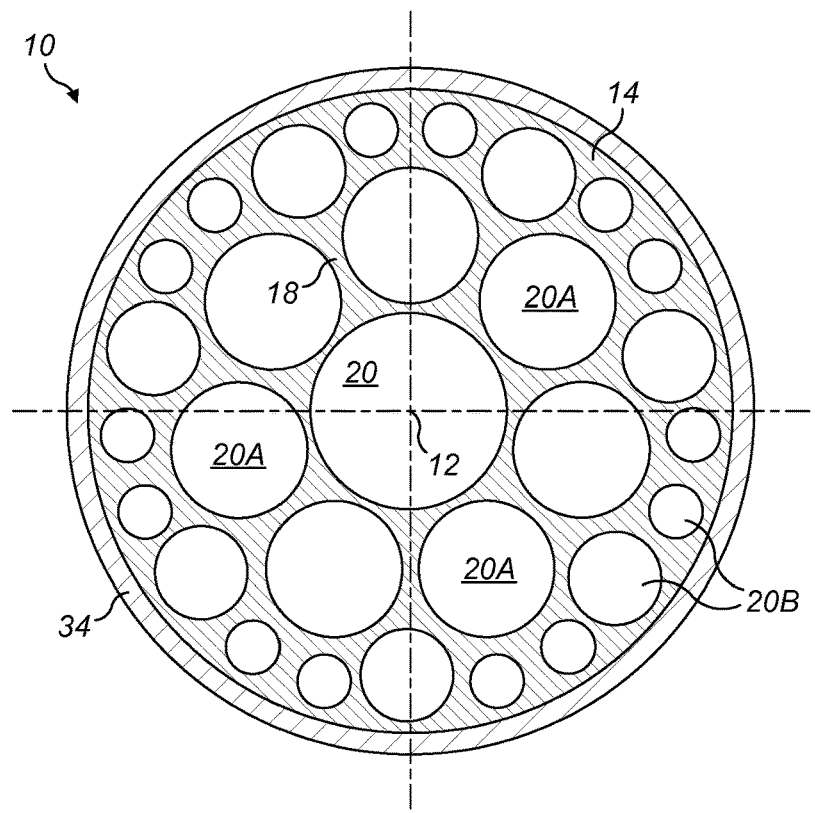
FIG. 10 is a schematic cross-sectional view of a buoy of the invention whose internal structure comprises a fractal honeycomb formed by additive manufacturing.

Turning next to FIG. 10, this shows how cavities 20 within a buoy 10 may also be disposed in curved fractal arrays. In this example, the frame 18 is a matrix that extends continuously between and around the discrete cavities 20. Here, the cavities 20 are spheroidal or ellipsoidal and are disposed mainly in circular arrays or rings that are concentric with a circular-section shell 14 of the buoy 10. The arrays are tiered in hyperbolic relation such that the cavities 20 become smaller from tier to tier, and the successive tiers therefore become narrower, in a radially outward direction.

Specifically, the buoy 10 shown in FIG. 10 comprises a central cavity 20 surrounded by an inner tier of cavities 20A in a heptagonal array and an outer tier of cavities 20B of differing diameters, the arrangement being akin to a Poincaré hyperbolic disk. Further tiers of yet smaller cavities could of course be provided within the shell 14 outside the outer tier of cavities 20B.

It will be apparent from FIG. 10 that, again, the material of the frame 18 is concentrated closer to the shell 14. The number of members of the frame 18 that connect to the shell 14 is maximised and their mutual spacing is minimised to provide optimal support for the shell 14 against hydrostatic pressure.

FIG. 10 also shows the optional feature of an anti-corrosion coating, layer or jacket 34, for example of a polymer material, that extends continuously around the outside of the shell 14 to protect the buoy 10 from corrosion due to exposure to seawater.

Figure 11:
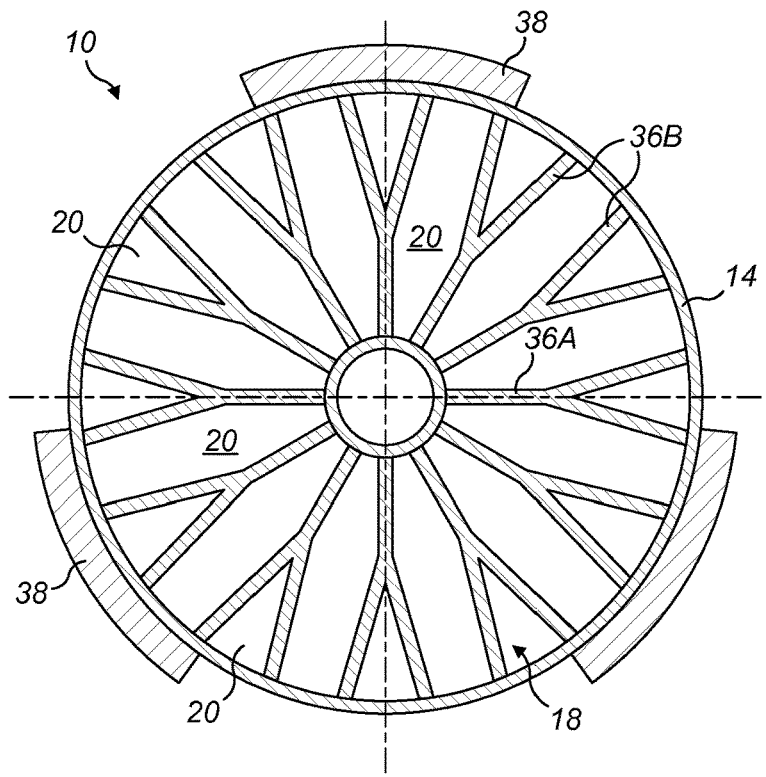
FIG. 11 is a schematic cross-sectional view of a buoy of the invention having a spoked skeletal internal structure formed by additive manufacturing.

FIG. 11 shows how the internal structure of a buoy 10 may be formed from a frame 18 of angularly-spaced, radially-extending members being ribs or spokes 36 that define discrete cavities 20 between them. This example also adopts a fractal arrangement because each spoke has a Y-shape, being split or bifurcated at an intermediate radius from a radially inner root portion 36A into a splayed pair of arms 36B that join the circular-section shell 14 of the buoy 10. The root portions 36A form an inner tier of the fractal arrangement and the arms 36B form an outer tier of the fractal arrangement.

Thus, in FIG. 11, the number of members of the frame 18 that connect to the shell 14 is again maximised and their mutual spacing is minimised to provide optimal support for the shell 14 against hydrostatic pressure. It would of course be possible for each arm 36B of each spoke 36 to divide again to form further tiers of the fractal structure.

FIG. 11 also shows the optional feature of sacrificial anodes 38 to protect the buoy from seawater corrosion. The anodes 38 are positioned in electrically conductive contact with the outside of the shell 14, and may for example be distributed angularly around the shell 14 as shown. Anodes 38 may be provided instead of, or in addition to, an anti-corrosion coating like that shown in FIG. 10.

It is also possible to determine the structure of a buoy 10 using a topology optimisation algorithm, which typically results in an irregular structure that achieves improved performance in terms of weight and buoyancy relative to the buoys 10 described above having frames 18 with regular and/or fractal arrays.

Figure 12:
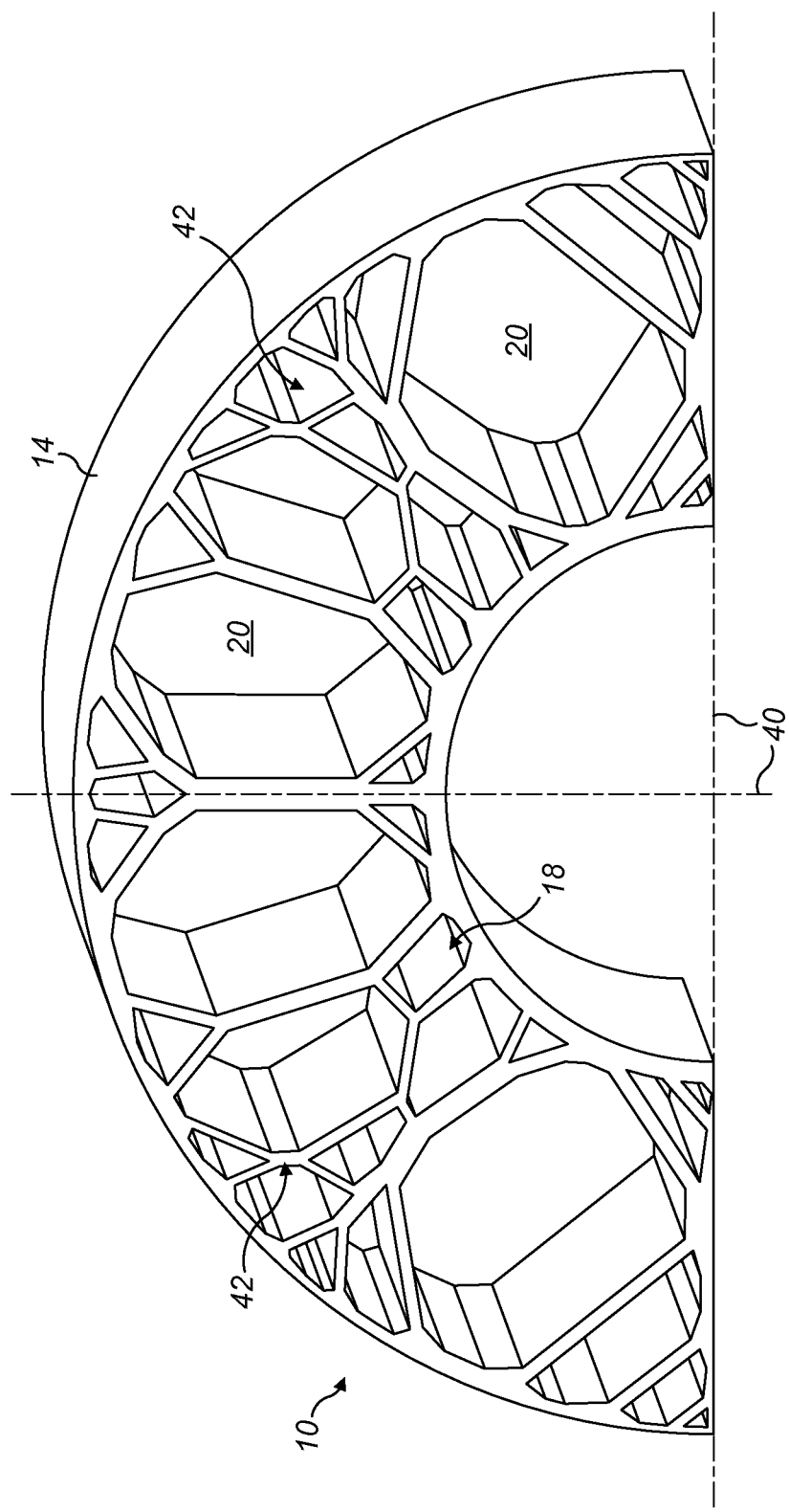
FIG. 12 is a schematic cross-sectional view of a buoy of the invention having an irregular internal structure formed by additive manufacturing.

An example of a buoy 10 having such an optimised structure can be seen in FIG. 12, which shows the internal structure of an upper half of the buoy 10. The frame 18, the physical characteristics of which have been determined using a topology optimisation algorithm, has cavities 20 that are irregular in size, shape and spacing, which are defined by correspondingly irregular members of the frame 18. The shell 14 remains continuous to enclose the internal volume of the buoy 10, but varies in thickness in accordance with the local level of support provided by the members of the frame 18 where they connect to the shell 14, thereby achieving weight savings in areas where the underlying support provided by the frame 18 is locally enhanced.

To reduce the computing power and time required to determine the overall structure, in this example the buoy 10 has a pair of orthogonal, radial axes of symmetry 40 dividing the frame 18 into quadrants 42 having similar, albeit mirrored structures. Accordingly, the lower half of the buoy 10 that is not visible in FIG. 12 is a mirror-image of the visible upper half. The embodiment shown in FIG. 12 therefore has a degree of regularly to the extent that the quadrants 42 are similar, while each individual quadrant 42 remains irregular. It will be appreciated that the structure could be entirely irregular, however.

Many other variations are possible within the inventive concept. For example, it may be possible for the cavities within a buoy to be filled with a fluid other than gas, such as a liquid like kerosene that is less dense than water, or another material such as a foam that is that is less dense than water.

Members of the frame of the internal structure of a buoy may be of variable or differing thicknesses. For example, the members of the frame in an inner tier may be thicker than members of the frame in an outer tier of a fractal arrangement.

The invention claimed is:

1. A subsea buoy, comprising an external shell that is rigid and watertight extending continuously around an internal space that is sealed and fully enclosed by the external shell, wherein the external shell is supported by a foraminous internal structure within the internal space, formed integrally with the external shell, wherein the foraminous internal structure is formed of aluminium and comprises structural members extending within the internal space and cavities disposed between the structural members, the structural members being in an array comprising an outer tier of the structural members extending inwardly from the external shell into the internal space and at least one inner tier of the structural members disposed within the outer tier, wherein the structural members of the outer tier are spaced closer together than the structural members of the inner tier.

2. The subsea buoy of claim 1, wherein the cavities are discrete spaces that are isolated from each other.

3. The subsea buoy of claim 2, wherein the cavities are generally ellipsoidal or spheroidal voids, each surrounded by webs of a continuous matrix that defines the structural members.

4. The subsea buoy of claim 1, wherein the cavities are conjoined spaces that communicate with each other.

5. The subsea buoy of claim 4, wherein the foraminous internal structure is skeletal.

6. The subsea buoy of claim 5, wherein the structural members are struts that cooperate to form trusses.

7. The subsea buoy of claim 1, wherein the structural members are arranged in a lattice.

8. The subsea buoy of claim 1, wherein the cavities are generally polyhedral.

9. The subsea buoy of claim 8, wherein the cavities are substantially tetrahedral or octahedral.

10. The subsea buoy of claim 1, wherein the structural members of the outer tier are in fractal relation to the structural members of the inner tier.

11. The subsea buoy of claim 1, wherein the outer tier extends parallel to a wall of the external shell from which the structural members of the outer tier extend inwardly into the internal space.

12. The subsea buoy of claim 1, wherein the structural members of the inner tier are thicker than the structural members of the outer tier.

13. The subsea buoy of claim 1, wherein the cavities of the inner tier are larger than the cavities of the outer tier.

14. The subsea buoy of claim 1, wherein each structural member of the inner tier divides into two or more structural members of the outer tier.

15. The subsea buoy of claim 1, wherein the outer tier is narrower than the inner tier.

16. The subsea buoy of claim 1, wherein the cavities of the foraminous internal structure have an aggregate volume of at least 63% of the external volume of the external shell.

17. The subsea buoy of claim 16, wherein the cavities of the foraminous internal structure have an aggregate volume of up to 83% of the external volume of the external shell.

18. The subsea buoy of claim 1, wherein the external shell is formed of aluminium.

19. The subsea buoy of claim 1, wherein the foraminous internal structure and the external shell are formed of differing materials.

20. The subsea buoy of claim 1, further comprising an external anti-corrosion jacket extending continuously around the external shell.

21. The subsea buoy of claim 1, further comprising at least one sacrificial anode mounted on the external shell.

22. The subsea buoy of claim 1, wherein the geometry of the foraminous internal structure and/or the external shell has been determined by an optimisation algorithm.

23. A method of making a subsea buoy, comprising:
using an additive manufacturing process to form a foraminous internal structure of aluminium; and
simultaneously, using the additive manufacturing process to form a rigid continuous watertight external shell that is rigid, continuous and watertight around and integral with the foraminous internal structure, which external shell, when completed, seals and fully encloses the foraminous internal structure;
wherein the method further comprises progressively adding material to form structural members of the foraminous internal structure that are integral with the external shell and to define cavities of the foraminous internal structure between the structural members, so that the structural members are arranged in an array comprising an outer tier of the structural members extending inwardly from the shell into the internal space and at least one inner tier of the structural members disposed within the outer tier, wherein the structural members of the outer tier are spaced closer together than the structural members of the inner tier.

24. The method of claim 23, wherein the additive manufacturing process is selected from a group comprising direct metal laser sintering, electron beam melting, selective heat sintering, selective laser melting, selective laser sintering, indirect metal printing, directed energy deposition, and fuse deposition modeling.

25. The method of claim 23, comprising forming the external shell from aluminium.

26. The method of claim 23, comprising forming the foraminous internal structure and the external shell from differing materials.

27. The method of claim 23, comprising determining a geometry of the foraminous internal structure and/or the external shell using an optimization algorithm.

* * * * *